United States Patent

Otsuka et al.

[11] Patent Number: 5,934,546
[45] Date of Patent: Aug. 10, 1999

[54] PROCESS FOR BRAZING DIE-CAST ALUMINUM MATERIAL

[75] Inventors: Ryotatsu Otsuka; Koji Ashida, both of Osaka; Yuji Asano, Tochigi, all of Japan

[73] Assignee: Showa Aluminum Corporation, Osaka, Japan

[21] Appl. No.: 08/977,446

[22] Filed: Nov. 26, 1997

[30] Foreign Application Priority Data

Nov. 29, 1996 [JP] Japan ................................. 8-320144

[51] Int. Cl.$^6$ ........................................ B23K 31/02
[52] U.S. Cl. ........................................ 228/262.51; 228/232
[58] Field of Search ........................... 228/183, 262.51, 228/214, 223, 232

[56] References Cited

U.S. PATENT DOCUMENTS 4,119,262 10/1978 Yen .......................................... 228/206
4,901,908 2/1990 Negura et al. ......................... 228/183
5,549,927 8/1996 Cottone et al. ........................ 427/191

FOREIGN PATENT DOCUMENTS 0 029 511  6/1981  European Pat. Off. .

Primary Examiner—Samuel M. Heinrich

[57] ABSTRACT

A process for brazing a die-cast aluminum material, wherein a die-cast aluminum material produced at a gate speed of 20 m/s or higher is used to be brazed at a brazing temperature of 500° C. or lower. Further, it is preferred that the die-cast aluminum material is produced under a casting pressure of 600 kgf/cm$^2$ or lower, or that the die-cast aluminum material is produced while depressurizing a mold. Brazing may as well be conducted using a brazing filler metal material composed of 6 to 24 wt. % of Al and the balance consisting of Zn and impurities. In the foregoing manner, the die-cast aluminum material can be brazed by heating it to a high temperature.

17 Claims, No Drawings

PROCESS FOR BRAZING DIE-CAST ALUMINUM MATERIAL

TECHNICAL FIELD

The present invention relates to a process for brazing a die-cast aluminum material.

It is to be noted that the word "aluminum" is used to encompass alloys thereof as well in its meaning in this description.

RELATED ART

Die-cast aluminum products are widely used in various fields including those of automotive parts and appliances because complicatedly shaped products in a good casting surface state can be fabricated through short-time casting with a good productivity. Since die-cast aluminum products have the foregoing features, die-cast materials are desired to be mutually joined either to each other or to a cast material or an elongated material for service thereof.

Since, however, a die-cast aluminum material causes bulging called blisters on the surface thereof when exposed to a high temperature of about 400° C. or higher, it cannot be brazed by heating to a temperature of 400° C. or higher. Further, when brazing is effected at a low temperature in order to avoid bulging, the effect of removing an oxide film on the surface of the matrix material is reduced because the melting of a flux is so insufficient as to deteriorate wetting and spreading of a brazing filler metal, thus entailing the problem of failure in securing sufficient joint strength.

DISCLOSURE OF INVENTION

The present invention has been made in view of the foregoing technical background and an object of the invention is to provide a process for brazing a die-cast aluminum material capable of being brazed through heating thereof to a high temperature.

In order to attain the foregoing object, the present invention is characterized in that a die-cast aluminum material produced at a gate speed of 20 m/s or higher to be brazed at a brazing temperature of 500° C. or lower.

The composition of the die-cast aluminum material to be used in the present invention is not particularly limited, and may therefore be appropriately selected from among JIS aluminum and others, representative examples of which include JIS ADC10 and ADC12.

The die-cast aluminum material is produced by injecting molten aluminum into a mold from a sprue. According to the present invention, the speed of aluminum injection from the sprue, i.e., the gate speed thereof, is specified to be 20 m/s or higher. The reason for this will be described below.

The molten aluminum infected from a sprue flows in accordance with the shape of a mold and gases in the mold such as air and nitrogen are entrained therein during such melt flow. The entrained gases are presumed to be fined and dispersed by setting the gate speed as high as 20 m/s or higher. As a result, bulging can be suppressed during subsequent heating for brazing. When the gate speed is lower than 20 m/s, such an effect is so poor that large bulges are developed during heating for brazing and hinder brazing. The gate speed is preferably set at 30 m/s or higher, especially at 40 m/s or higher. On the other hand, the upper limit of the gate speed, though it is not particularly limited, is naturally limited because sand burning occurs on the mold when the gate speed is too high. It is to be noted that a requisite of a gate speed of 20 m/s or higher is most advantageously materialized only by remodeling a mold while using a die casting machine intact in aspects of simplicity and cost.

Conditions other than the gate speed may be arbitrarily set, but a casting pressure (on-metal pressure) is preferably set at 600 kgf/cm$^2$ or lower. When the casting pressure exceeds 600 kgf/cm$^2$, the pressure of the gases entrained in the die-cast material also becomes high and liable to develop bulging during heating for brazing. Especially it may as well be set preferably at 500 kgf/cm$^2$ or lower. On the other hand, when the casting pressure is too low, a difficulty is encountered in profiling because of a poor run of the poured metal. Thus, the casting pressure may as well be set at least 200 kgf/cm$^2$ or higher. Further, the mold is preferably depressurized since a higher-quality die-cast material and also a higher-quality brazed product in its turn can be obtained due to a decrease in the absolute amount of the gases entrained in the die-cast material. In depressurizing the mold, the timing of initiation of depressurization is preferably before a plunger blocks a melt injection port. Even if the mold is not depressurized, good brazing can be attained according to the present invention.

The die-cast material produced under the foregoing conditions is used for brazing in combination with other aluminum joining members. The brazing temperature is required to be set at 500° C. or lower. This is because, when the brazing temperature exceeds 500° C., bulging is developed even when the die-cast aluminum material produced at a gate speed of 20 m/s or higher is used and accordingly good brazing is hindered while causing a dimensional change in the die-cast material. The brazing temperature may as well be set preferably at 480° C. or lower. On the other hand, although the lower limit of the brazing temperature is not limited, heating may as well be effected up to 400° C. or higher, further preferably to 420° C. or higher, in order to effectively exhibit the properties of the die-cast material used in the present invention.

The joining member to be used in combination with a die-cast aluminum material for brazing therebetween in the present invention may be one of a die-cast aluminum material, an elongated aluminum material and a cast aluminum material.

Any brazing filler metal material having a melting point determined in connection with a brazing temperature of 500° C. or lower can be used in the foregoing brazing, suitable examples of which include brazing filler metal materials composed of 6 to 24% by weight(hereinafter referred to as wt. %) of Al and the balance consisting of Zn and impurities. In such brazing filler metal materials, Al is incorporated thereinto for the purpose of adjusting the melting point of the brazing filler metal material (the range of melting temperatures). When the Al content is lower than 6 wt. %, there is inconvenience such as that the brazing filler metal sags down during brazing in a posture of inclination and that no usable flux exists, because the melting point is too low. On the other hand, when it exceeds 24 wt. %, sometimes it occurs that the brazing filler metal material Is not melted even at 500° C., because the melting point is too high. The PA content may as well be set to be preferably 8 wt. % or more and 20 wt. % or less. The balance of the brazing filler metal material is Zn with permissible existence of impurities.

Any of a chloride flux, a fluoride flux, a mixture thereof, and others may be appropriately used as a flux in brazing in connection with the brazing temperature and the melting point of the brazing filler metal material in so far as it can be melted at a temperature lower than them. Examples of a low-melting flux are a flux comprising a mixture composed of 14 wt. % of $BaCl_2$, 2 wt. % of NaCl, 38 wt. % of KCl, 9 wt. % of LiCl, 17 wt. % of $ZnCl_2$, 6 wt. % of $KAlF_4$, 1 wt. % of LiF and 13 wt. % of $PbCl_2$, and a flux composed of $CsAlF_4$.

Meanwhile, the method of feeding the brazing filler metal material and the flux and other brazing conditions are not limited, either.

According to the process of the present invention for brazing a die-cast aluminum material, it is presumed that the entrained gases may be fined and dispersed, because the die-cast aluminum material is produced at a gate speed of 20 m/s or higher. Since such a die-cast material is used to be brazed at a brazing temperature of 500° C. or lower, the expansion of the gases entrained during heating for brazing is suppressed, accordingly the extent of bulging is also suppressed and there is a decrease in the number of bulges, whereby good brazing can be attained.

Since the present invention is characterized in that the die-cast aluminum material produced at a gate speed of 20 m/s or higher is used to be brazed in the foregoing manner at a brazing temperature of 500° C. or lower, development of bulging is suppressed during heating for brazing and accordingly good brazing can be attained even when brazing is conducted in the temperature range of 500° C. or lower, for example, at a comparatively high temperature of 400° C. or higher. As a result, there can be provided composite brazed products with a die-cast aluminum material brazed with other joining members, examples of which include automotive parts such as an air intake manifold, and other brazed articles.

Moreover, since it is possible to conduct a brazing at a comparatively high temperature, the freedom of choice of a flux and a brazing filler metal material is widened and brazing can be conducted easily.

Further, when a die-cast aluminum material produced at a gate speed of 30 m/s or higher is used, the extent of bulging is further suppressed during heating for brazing because gases are remarkably fined and dispersed.

Further, when a die-cast aluminum material is produced under a casting pressure of 600 $kgf/cm^2$ or lower, there can be secured an effect of still further suppressing bulging in addition to the foregoing effects.

Further, the die-cast aluminum material produced while depressurizing a mold can be suppressed in the extent of bulging because the amount of the gases entrained therein is small in itself.

Further, when brazing is conducted using a brazing filler metal material composed of 6 to 24 wt. % of Al and the balance consisting of Zn and impurities, the effect of enabling still more better brazing can be secured because the brazing filler metal material has such a low melting point.

DESCRIPTION OF PREFERRED EMBODIMENTS (Example 1)

JIS ADC10 was used as the aluminum for die casting to produce die-cast aluminum materials each in the form of a flat plate having a longitudinal length of 100 mm, a lateral length of 150 mm and a thickness of 8 mm under, the conditions of a gate speed, a casting pressure and whether there is mold depressurization or not ware set as shown in the following Table 1.

Subsequently, each of the resulting die-cast materials was united with an aluminum extrusion made of JIS A6063 and having the same shape and size in a T-shaped form. A bar-shaped brazing filler metal material of 3 mm in diameter was then disposed on the junction and coated with a flux to conduct brazing at a brazing temperature as shown in Table 1. Herein, the brazing filler metal material comprising Zn-16 wt. % Al was used while the flux comprising a mixture of 14 wt. % of $BaCl_2$, 2 wt. % of NaCl, 38 wt. % of KCl, 9 wt. % of LiCl, 17 wt. % of $ZnCl_2$, 6 wt. % of $KAlF_4$, 1 wt. % of LiF and 13 wt. % of $PbCl_2$ was used. Brazing was conducted while setting each die-cast material in a posture of 45-degree inclination as against the horizon.

The state and appearance of the resulting brazed product was visually observed. The results are also shown in Table 1.

TABLE 1

| Sample No. | Gate speed (m/s) | Casting pressure ($kgf/cm^2$) | Mold depressurization | Brazing temp. (°C.) | Evaluation (Note 1) |
|---|---|---|---|---|---|
| Ex. | | | | | |
| 1 | 20 | 500 | none | 450 | C |
| 2 | 30 | 500 | none | 450 | B |
| 3 | 50 | 500 | none | 450 | B |
| 4 | 30 | 300 | none | 450 | B |
| 5 | 30 | 500 | effected | 450 | A |
| 6 | 50 | 300 | effected | 450 | A |
| 7 | 20 | 860 | none | 450 | D |
| 8 | 50 | 860 | effected | 450 | B |
| 9 | 50 | 700 | none | 450 | C |
| Comp. Ex. | | | | | |
| 10 | 18 | 500 | none | 450 | E |
| 11 | 50 | 300 | effected | 520 | E |

Ex. . . . Example
Comp. Ex. . . . Comparative Example
(Note 1)
A: No blistering was recognized at all and a brazing state was very good.
B: A little blistering occurred but there were no problem in appearance and brazing state.
C: Blistering was marked apparently, but there was no problem in brazing state.
D: Blistering was more marked than C above, but there was no problem in brazing state.
E: Large blisters developed and the appearance and brazing state were poor.

As is apparent from the results shown in Table 1, blistering was either hardly recognized or practically trouble-free, even if recognized, with a good and nonproblematic brazing state in the products produced at a gate speed and a brazing temperature falling within the respective ranges according to the present invention, By contrast, large blisters developed and the brazing state was poor in the product obtained at a gate speed (Sample No. 10) and a brazing temperature (Sample No. 11), which are out of the range according to the present invention.

It is further appreciated in comparison between Samples Nos. 1 and 7, 3 and 8, or 6 and 9 that blistering can be further suppressed when a die-cast material produced under a casting pressure of 600 $kgf/cm^2$ or lower is used.

It is further appreciated in comparison between Samples Nos. 2 and 5 that blistering can be still further suppressed by conducting a mold depressurization.

(Example 2)

Substantially the same brazing procedure as in Example 1 above was repeated using a die-cast aluminum material shown as Sample No. 6 in Table 1, except that $CsAlF_4$ was used as the flux, together with a brazing filler metal material as shown in the following Table 2 while setting the brazing temperature as shown in Table 2. The brazing state after brazing was visually observed. The results are shown in Table 2.

TABLE 2

| Sample No. | Composition of brazing filler metal material (wt. %) | | Brazing temp. (°C.) | Brazing state (Note 2) |
|---|---|---|---|---|
| | Al | Zn | | |
| Comp. Ex. | | | | |
| 12 | 5 | balance | 400 | Δ |
| 13 | 10 | balance | 420 | ○ |
| 14 | 14 | balance | 450 | ⊚ |
| 15 | 16 | balance | 460 | ⊚ |
| 16 | 20 | balance | 480 | ⊚ |
| 17 | 24 | balance | 500 | ○ |
| Comp. Ex. | | | | |
| 18 | 26 | balance | 500 | x |

Ex. ... Example
Comp. Ex. ... Comparative Example
(Note 2)
⊚: very good
○: good
Δ: A brazing filler metal material flowed down along the inclination and a brazing state was poor.
x: A brazing filler metal material was not melted and a brazing state was poor.

As is apparent from the results in Table 2, it could be confirmed that when a brazing filler metal material having an Al content falling within the range as specified in the present invention was used, a good brazing state could be achieved.

What is claimed is:

1. A process for brazing a die-cast aluminum material, comprising brazing a die-cast aluminum material produced at a gate speed of 20 m/s or higher at a brazing temperature of 500° C. or lower.

2. The process for brazing a die-cast aluminum material as claimed in claim 1, wherein said die-cast aluminum material is produced at a gate speed of 30 m/s or higher.

3. The process for brazing a die-cast aluminum material as claimed in claim 1 or 2, wherein said die-cast aluminum material is produced under a casting pressure of 600 kgf/cm$^2$ or lower.

4. The process for brazing a die-cast aluminum material as claimed in claim 1 or 2, wherein said die-cast aluminum material is produced while depressurizing a mold.

5. The process for brazing a die-cast aluminum material as claimed in claim 3, wherein said die-cast aluminum material is produced while depressurizing a mold.

6. The process for brazing a die-cast aluminum material as claimed in claim 1 or 2, wherein brazing is conducted at a brazing temperature of 480° C. or lower.

7. The process for brazing a die-cast aluminum material as claimed in claim 3, wherein brazing is conducted at a brazing temperature of 480° C. or lower.

8. The process for brazing a die-cast aluminum material as claimed in claim 4, wherein brazing is conducted at a brazing temperature of 480° C. or lower.

9. The process for brazing a die-cast aluminum material as claimed in claim 5, wherein brazing is conducted at a brazing temperature of 480° C. or lower.

10. The process for brazing a die-cast aluminum material as claimed in claim 1 or 2, wherein brazing is conducted using a brazing filler metal material composed of 6 to 24 wt. % of Al and the balance consisting of Zn and impurities.

11. The process for brazing a die-cast aluminum material as claimed in claim 3, wherein brazing is conducted using a brazing filler metal material composed of 6 to 24 wt. % of At and the balance consisting of Zn and impurities.

12. The process for brazing a die-cast aluminum material as claimed in claim 4, wherein brazing is conducted using a brazing filler metal material composed of 6 to 24 wt. % of Al and the balance consisting of Zn and impurities.

13. The process for brazing a die-cast aluminum material as claimed in claim 5, wherein brazing is conducted using a brazing filler metal material composed of 6 to 24 wt. % of Al and the balance consisting of Zn and impurities.

14. The process for brazing a die-cast aluminum material as claimed in claim 6, wherein brazing is conducted using a brazing filler metal material composed of 6 to 24 wt. % of Al and the balance consisting of Zn and impurities.

15. The process for brazing a die-cast aluminum material as claimed in claim 7, wherein brazing is conducted using a brazing filler metal material composed of 6 to 24 wt. % of Al and the balance consisting of Zn and impurities.

16. The process for brazing a die-cast aluminum material as claimed in claim 8, wherein brazing is conducted using a brazing filler metal material composed of 6 to 24 wt. % of Al and the balance consisting of Zn and impurities.

17. The process for brazing a die-cast aluminum material as claimed in claim 9, wherein brazing is conducted using a brazing filler metal material composed of 6 to 24 wt. % of Al and the balance consisting of Zn and impurities.

* * * * *